(12) United States Patent
Bastide et al.

(10) Patent No.: US 11,288,323 B2
(45) Date of Patent: Mar. 29, 2022

(54) PROCESSING DATABASE QUERIES USING DATA DELIVERY QUEUE

(71) Applicant: International Business Machines Corporation, Armonk, NY (US)

(72) Inventors: Paul R. Bastide, Ashland, MA (US); Robert E. Loredo, North Miami Beach, FL (US); Matthew E. Broomhall, Goffstown, NH (US)

(73) Assignee: International Business Machines Corporation, Armonk, NY (US)

(*) Notice: Subject to any disclaimer, the term of this patent is extended or adjusted under 35 U.S.C. 154(b) by 283 days.

(21) Appl. No.: 16/802,682

(22) Filed: Feb. 27, 2020

(65) Prior Publication Data
US 2021/0271715 A1 Sep. 2, 2021

(51) Int. Cl.
*G06F 16/903* (2019.01)
*G06F 9/54* (2006.01)

(52) U.S. Cl.
CPC ........ *G06F 16/90335* (2019.01); *G06F 9/546* (2013.01)

(58) Field of Classification Search
None
See application file for complete search history.

(56) References Cited

U.S. PATENT DOCUMENTS

| | | | |
|---|---|---|---|
| 5,533,052 A * | 7/1996 | Bhaskar | G10L 19/0212 341/76 |
| 6,466,936 B1 | 10/2002 | Ronström | |
| 7,292,956 B1 | 11/2007 | Guday et al. | |
| 2006/0039287 A1* | 2/2006 | Hasegawa | H04L 69/163 370/238 |
| 2009/0052540 A1* | 2/2009 | Gutman | H04N 21/4347 375/240.24 |
| 2013/0191370 A1 | 7/2013 | Chen et al. | |
| 2014/0100865 A1 | 4/2014 | Beaton et al. | |
| 2019/0130007 A1 | 5/2019 | Hao et al. | |
| 2019/0156927 A1 | 5/2019 | Virkar et al. | |

* cited by examiner

*Primary Examiner* — Uyen T Le
(74) *Attorney, Agent, or Firm* — Edell, Shapiro & Finnan, LLC (57) ABSTRACT

A computer system processes data requests using a data delivery queue. A query received from a client is processed to generate response data, wherein the response data is held in a queue prior to transmitting to the client. The response data in the queue is iteratively divided into a plurality of blocks, wherein each block of the plurality of blocks is compressed prior to transmitting to the client, and wherein a block size of a given block is determined based on an amount of time to compress and transmit a preceding block. The plurality of blocks are transmitted to the client. Embodiments of the present invention further include a method and program product for processing data requests using a data delivery queue in substantially the same manner described above.

20 Claims, 6 Drawing Sheets

PROCESSING DATABASE QUERIES USING DATA DELIVERY QUEUE

BACKGROUND

1. Technical Field

Present invention embodiments relate to processing database queries, and more specifically, to processing database queries using a data queue for delivering data that is requested by the database queries.

2. Discussion of the Related Art

In multi-tenant environments, the data of multiple vendors, customers, or organizations may co-exist in a same logical data processing system. Data can be added to a system using extract, transform, and load (ETL) procedures, and data may be stored using solutions such as data lakes, data reservoirs, or data marts. To access stored data, a client application may provide a query to a database system, which processes the query in order to retrieve the requested data for the client. Often, query processing can be complex or time-consuming, causing lengthy delays before a database system is able to deliver the requested data. In such cases, a client application's connection to the database system may time out or be disrupted before the client application's query results can be returned.

SUMMARY

According to one embodiment of the present invention, a computer system processes data requests using a data delivery queue. A query received from a client is processed to generate response data, wherein the response data is held in a queue prior to transmitting to the client. The response data in the queue is iteratively divided into a plurality of blocks, wherein each block of the plurality of blocks is compressed prior to transmitting to the client, and wherein a block size of a given block is determined based on an amount of time to compress and transmit a preceding block. The plurality of blocks are transmitted to the client. Embodiments of the present invention further include a method and program product for processing data requests using a data delivery queue in substantially the same manner described above.

BRIEF DESCRIPTION OF THE DRAWINGS

Generally, like reference numerals in the various figures are utilized to designate like components.

DETAILED DESCRIPTION

Present invention embodiments relate to processing database queries, and more specifically, to processing database queries using a data queue for delivering data that is requested by the database queries. When a data server receives a database query from a client, the data server may process the request by obtaining, generating, or otherwise producing the requested data, and transmitting the data to the client. In an extract, transform, and load (ETL) environment, a database query may be executed by extracting data from one or more locations, transforming the data by performing one or more operations on the data, and loading the data into a target destination.

As query processing can often involve complex or lengthy backend operations, the connection between a client and a data server may time out or be interrupted before the data requested by a client's query can be delivered to the client. In particular, when a query's result data is compressed prior to transmitting to a client, the compression process may exceed a gateway timeout, making it impossible to deliver the result data back to the client. For example, an analytical report relating to cohort adherence to a medication protocol may include a high degree of repeating data, such as medications administered, generic names of the medications, first and last names of the patients, and the like. When a dataset contains a high degree of repeating data, the dataset may be highly compressible, but compression may be a relatively lengthy process. Thus, an analytical report that is 55,000 rows in length and 27 megabytes in size may be compressed to a size of only 384 kilobytes.

Moreover, while the data compression process may itself be time-consuming, a data server may not initiate compression operations until the entirety of result data is made available (e.g., upon completion of query execution). Thus, due to compression and/or other time-consuming aspects of query processing, a connection between a data server and a client may time out before the result data can be compressed and transmitted. Unfortunately, as computing devices can only maintain a finite number of simultaneous connections, connection timeouts are often unavoidable and must be enforced so that unused ports can be reallocated.

Present invention embodiments process database queries using a data delivery queue that ensures that the connection between a client and server is maintained during the course of processing a request and delivering requested data. In particular, the response data for a query is divided into blocks that are independently compressed and transmitted upon availability, thereby keeping the connection active. Thus, present invention embodiments avoid lengthy delays that would otherwise occur while waiting to complete query execution and to compress the resulting data.

Moreover, present invention embodiments include several additional features that improve delivery of response data back to a client. In particular, the response data for a query is divided into blocks using an iterative approach that bases a block's size on the observed performance of prior blocks. Thus, block size is iteratively increased until the time to compress and transmit a block of response data approaches the upper limit of a connection's timeout duration. Since blocks are compressed individually, fewer blocks of larger size will achieve an overall higher degree of compression, thereby improving data delivery by minimizing the amount of data that is transmitted. Additionally, the data delivery queue may function as a buffered pipeline by transmitting blocks of response data to a client in a manner that ensures that the connection remains active while avoiding emptying of the queue, which could lead to a delay that triggers a connection timeout.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
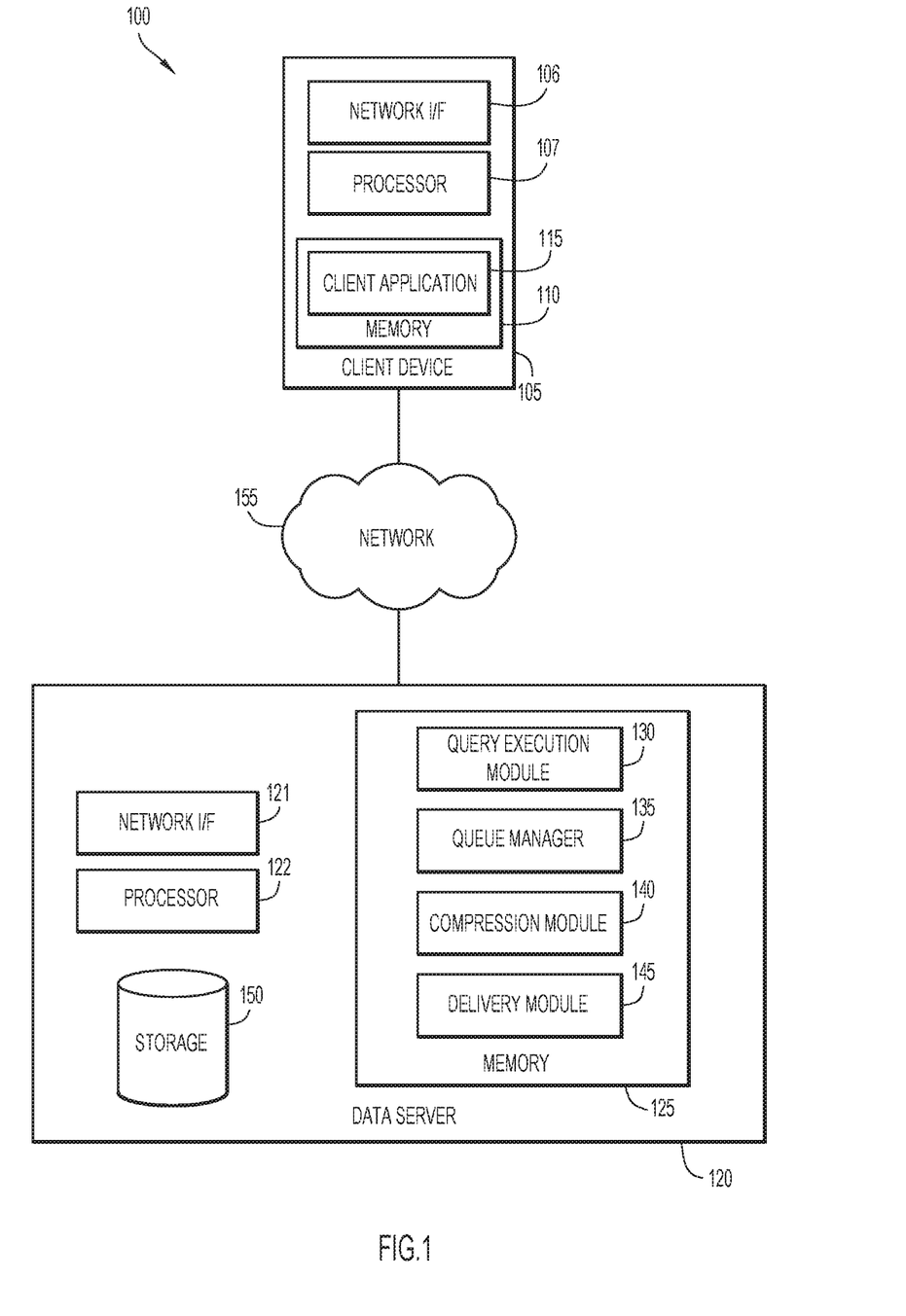
FIG. 1 is a block diagram depicting a computing environment for processing data requests using a data delivery queue in accordance with an embodiment of the present invention.

Present invention embodiments will now be described in detail with reference to the Figures. FIG. 1 is a block diagram depicting a computing environment 100 for processing data requests using a data delivery queue in accordance with an embodiment of the present invention. As depicted, computing environment 100 includes a client device 105, a data server 120, and a network 155. It is to be understood that the functional division among components of computing environment 100 have been chosen for purposes of explaining present invention embodiments and is not to be construed as a limiting example.

Client device 105 includes a network interface (I/F) 106, at least one processor 107, and memory 110 that includes a client application 115. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 155. In general, client device 105 sends database queries that can be executed by a data server, such as data server 120, to obtain desired data. Client device 105 may include internal and external hardware components, as depicted and described in further detail with respect to FIG. 5.

Client application 115 may include one or more modules or units to perform various functions of present invention embodiments described below. Client application 115 may be implemented by any combination of any quantity of software and/or hardware modules or units, and may reside within memory 110 of client device 105 for execution by a processor, such as processor 107.

Client application 115 may send a database query to data server 120 that includes a request for data. Client application 115 may automatically send database queries (e.g., in the course of executing predetermined/scheduled operations or as a result of receiving instructions from another computing device), and/or a user of client device 105 may provide input that instructs client application 115 to send a database query. Data requested by client application 115 may include any data obtainable from one or more sources (e.g., database 150) and/or any data generated as a result of processing obtained data. In particular, client application 115 may transmit a database query to data server 120 that enables data server 120 and its modules to execute the database query over one or more data stores in order to generate response data.

Client application 115 may receive response data as a result of sending a database query. A user of client device 105 may review or interact with response data via client application 115, which may include a user interface for presenting the response data to the user. The data received by client device 105 may be compressed according to any known or other compression algorithm or combination of algorithms, and client application 115 may decompress received data. In some embodiments, client application 115 receives multiple compressed blocks of data, which client application 115 decompresses and combines to assemble a complete set of results for a database query.

Data server 120 includes a network interface (I/F) 121, at least one processor 122, and memory 125. Memory 125 may include a query execution module 130, a queue manager 135, a compression module 140, and a delivery module 145. Data server 120 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 121 enables components of data server 120 to send and receive data over a network, such as network 155. In general, data server 120 executes database queries to generate response data, which is processed through a delivery queue and transmitted to a destination (e.g., client device 105). Data server 120 may include internal and external hardware components, as depicted and described in further detail with respect to FIG. 5.

Query execution module 130, queue manager 135, compression module 140, and delivery module 145 may include one or more modules or units to perform various functions of present invention embodiments described below. Query execution module 130, queue manager 135, compression module 140, and delivery module 145 may be implemented by any combination of any quantity of software and/or hardware modules or units, and may reside within memory 125 of data server 120 for execution by a processor, such as processor 122.

Query execution module 130 may execute database queries received by data server 120, which may include obtaining data from one or more sources and optionally, processing or otherwise manipulating the obtained data. A database query may thus include a request for query execution module 130 to obtain data from specified rows or columns of a database. In some embodiments, query execution module 130 executes extract, transform, and load (ETL) jobs. An ETL job may include operations such as extracting data from multiple sources, processing the extracted data, and loading the data to one or more destinations. ETL jobs can thus be useful for performing complex data retrieval and proccessing tasks, such as generating analytical reports. For example, a request for a report on a population or cohort of patients may involve the retrieval of a large amount of time-series event data stored across multiple sources, and may include operations such as data cleansing, transposing or splitting of rows or columns, deriving new values from collected data, and the like.

As query execution module 130 begins to execute a database query, query execution module 130 outputs response data that includes the results of executing the database query. Since query execution can be time-consuming, query execution module 130 may output response data over the course of several minutes. Query execution module 130 provides response data to a data queue, where the data is managed by queue manager 135 in accordance with present invention embodiments.

Queue manager 135 manages response data that is provided to a data queue by query execution module 130. In particular, queue manager 135 divides response data into blocks that are compressed by compression module 140 and delivered to a destination, such as client device 105, by delivery module 145. Queue manager 135 determines the size of each block of response data according to the observed performance of a prior block during the compression and delivery stages. Block size may be determined according to one or more metrics, such as a number of rows of response data that is included in a block, a number of rows of response data multiplied by a number of columns of response data, a data size (e.g., in bytes) of a block of data before or after compression, and the like.

Initially, queue manager 135 may form a first block that is a predetermined size to ensure that the block is small enough to be compressed and transmitted to client device 105 before a connection between client device 105 and data server 120 times out. Queue manager 135 may iteratively adjust the size of subsequent blocks of response data based on the performance of one or more previous blocks, increasing block size until the amount of time required to compress and transmit a block approaches a threshold value that is based on the connection timeout duration. The connection's timeout duration may be defined according to one or more of data server 120 and/or client 105.

In some embodiments, queue manager 135 may decrease the size of a block when compressing and/or transmitting a previous block requires an amount of time that is longer than the observed performance of previous blocks would suggest. When a section of response data requires more time to compress, or a connection between client device 105 and data server 120 experiences a decrease in transmission speed, a given block may take longer to compress and transmit than a previous block of a same or similar size did. Thus, queue manager 135 may iteratively adjust block size to ensure that blocks trend toward a large size, but do not become so large that the connection timeout is exceeded. Queue manager 135 may iteratively adjust block size based on a full timeout duration of a connection or based on a portion of the duration, such as half of the duration. For example, if a timeout duration of a connection is 120 seconds, queue manager 135 may size blocks such that the time to compress and transmit a given block approaches 120 seconds, or such that the time to compress and transmit a block is approximately half of the timeout duration (e.g., 60 seconds), and the like.

When queue manager 135 defines a block of response data, compression module 140 may compress the block using one or more known or other compression algorithms. In some embodiments, compression module 140 uses a lossless compression format such as gzip. Compression module 140 may utilize a dictionary or substitution coder that searches for matches between the data to be compressed and a set of strings contained in a data structure (called a "dictionary") that is maintained by the encoder. When the encoder finds such a match, it substitutes a reference to the string's position in the data structure. As compression module 140 compresses each block individually, a separate dictionary may be associated with each compressed block.

Delivery module 145 manages the transmission of compressed data blocks from the data queue to a destination, such as client device 105. In general, delivery module 145 ensures that the data queue serves as a buffered pipeline by delivering data at a rate that does not empty the data queue while also ensuring that the connection between client device 105 and data server 120 remains active. Each block may be transmitted with a dictionary generated by compression module 140 so that blocks can be individually decompressed as the blocks are received by client device 105. In some embodiments, delivery module 145 transmits a block of data by evenly distributing bytes over a connection's timeout window. Alternatively, delivery module 145 may distribute the delivery of a block over a timeout window by delivering bytes in groups that increase in size and/or delivering bytes in groups that have increasingly long delays between each group. For example, delivery module 145 may deliver a block according to a delayed expansion that is depicted and described in further detail below with reference to FIG. 4.

Database 150 may include any non-volatile storage media known in the art. For example, database 150 can be implemented with a tape library, optical library, one or more independent hard disk drives, or multiple hard disk drives in a redundant array of independent disks (RAID). Similarly, data in database 150 may conform to any suitable storage architecture known in the art, such as a file, a relational database, an object-oriented database, and/or one or more tables. In some embodiments, database 150 may store data that may be requested by a client, such as client device 105. Database 150 may aggregate data from one or more external sources accessible via network 155. In various embodiments, database 150 may include a data lake, a data reservoir, a data mart, and the like.

Network 155 may include a local area network (LAN), a wide area network (WAN) such as the Internet, or a combination of the two, and includes wired, wireless, or fiber optic connections. In general, network 155 can be any combination of connections and protocols known in the art that will support communications between client device 105 and/or data server 120 via their respective network interfaces in accordance with embodiments of the present invention.

Figure 2A:
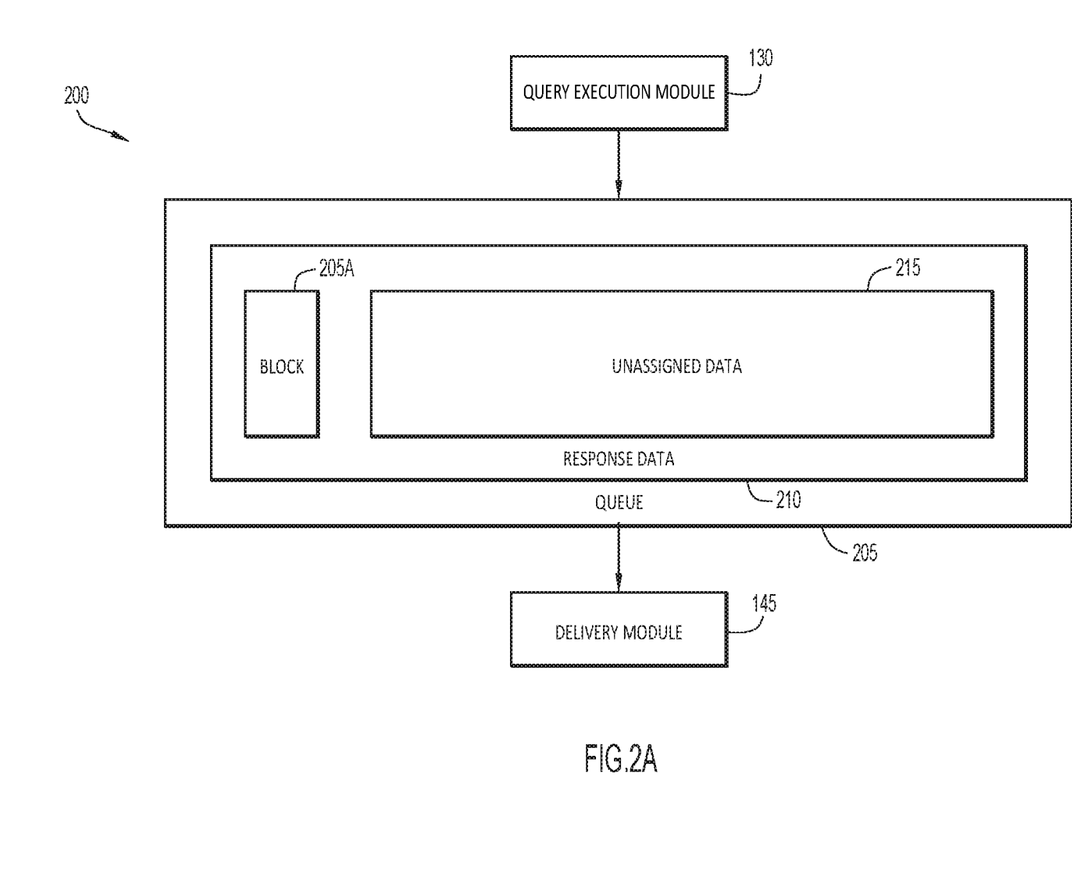
FIGS. 2A and 2B are block diagrams depicting a data delivery pipeline in accordance with an embodiment of the present invention.
Figure 2B:
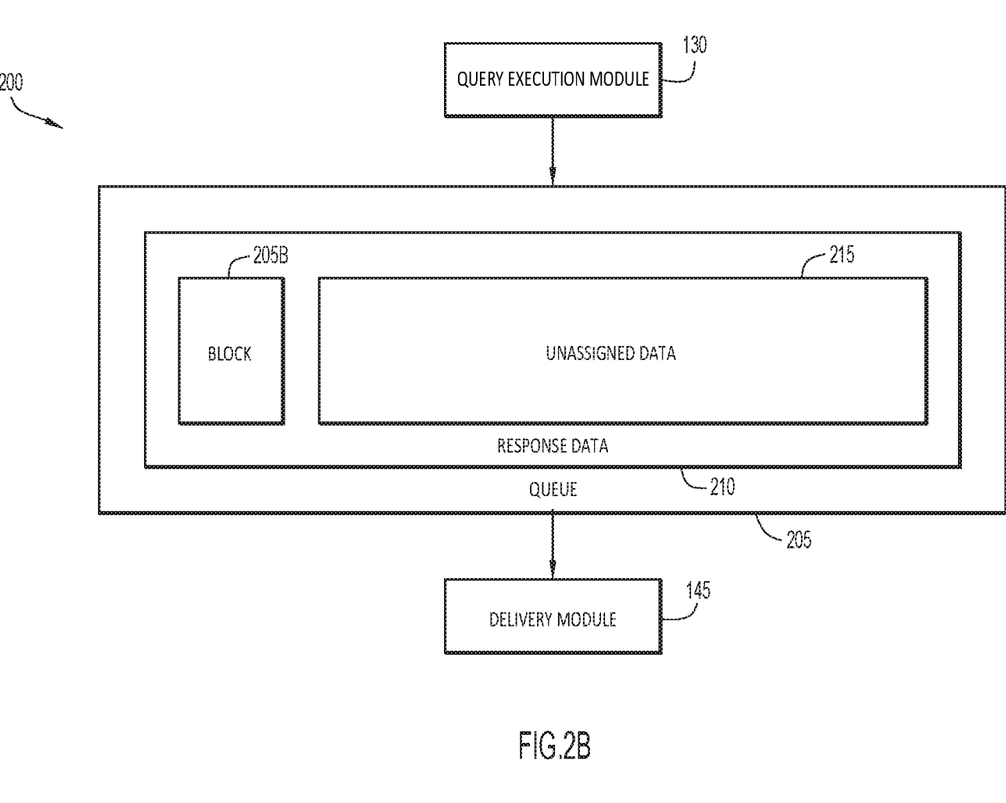

FIGS. 2A and 2B are block diagrams depicting a data delivery pipeline 200 in accordance with an embodiment of the present invention. As depicted, data delivery pipeline 200 includes query execution module 130, queue 205, and delivery module 145. Query execution module 130 provides response data 210 to queue 205, and queue manager 135 forms blocks using unassigned data 215 (e.g., response data that has been provided by query execution module 130 but has not yet been assigned to a block by queue manager 135). Response data 210 may be processed through queue 205 in a first-in, first-out order. Data in queue 205 may be held in active memory, may be stored on ephemeral disks, and/or may be stored in on-heap or off-heap memory.

Response data 210 may be divided into blocks that are sized iteratively by queue manager 135 based on the performance of previous blocks. In FIG. 2A, block 205A is formed using previously unassigned data 215 in queue 205. Block 205A may be sized according to an initial block size to ensure that a connection between client device 105 and data server 120 does not time out during compression and delivery of block 205A.

FIG. 2B depicts a subsequent block 205B that has a larger block size compared to block 205A of FIG. 2A. Queue manager 135 may define block 205B using a larger block size because block 205A was able to successfully be compressed and transmitted to its destination (e.g., client device 105) without approaching or exceeding the connection's timeout duration. In some embodiments, only one block of response data is formed at a time, and the rest of the data in queue 205 remains as unassigned data 215. A new block of response data may be formed only after delivering a previous block. For example, block 205B may not be formed until block 205A is delivered to a destination. In other embodiments, a block may not be transmitted to a destination until a subsequent block has been created. For example, block 205A may not be transmitted until block 205B has been generated. In the event that a connection is disrupted, queue manager 135 may resume the processing of data through pipeline 200 when the connection is re-established, and delivery module 145 can begin delivering data from the position of the last delivered block prior to the disruption.

Figure 3:
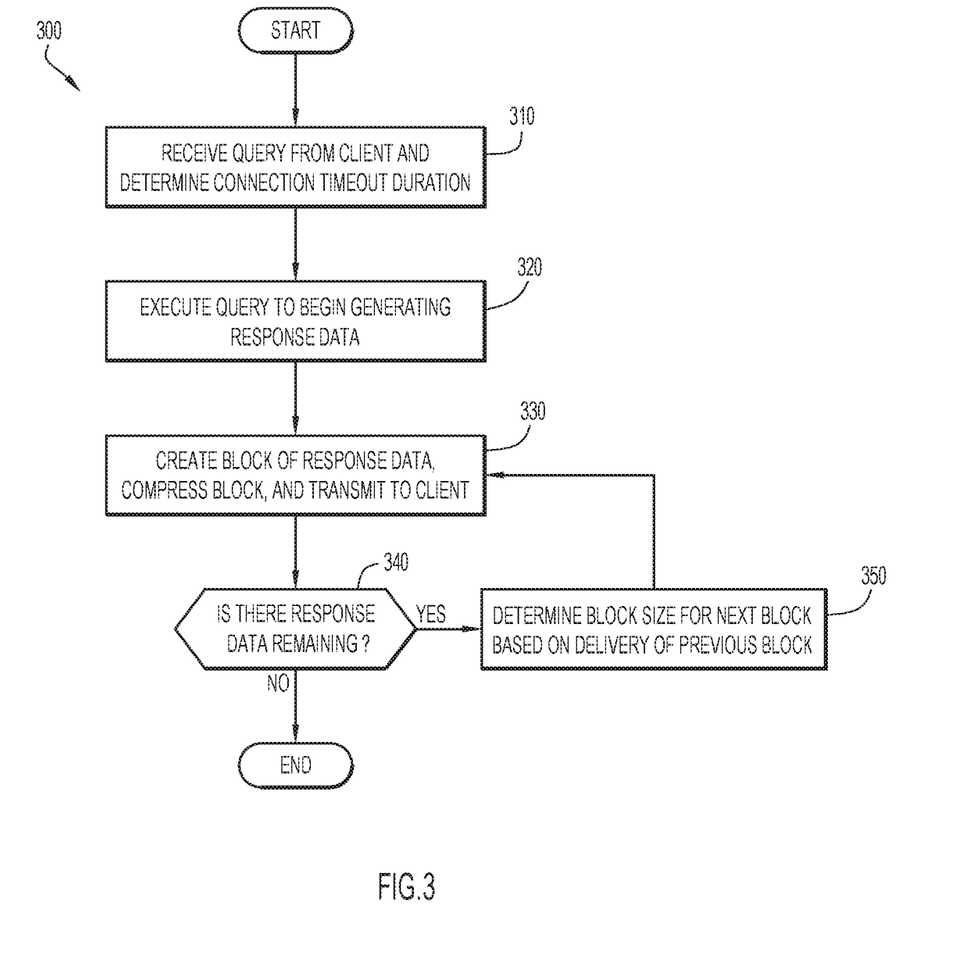
FIG. 3 is a flow chart depicting a method of managing a data delivery queue in accordance with an embodiment of the present invention.

FIG. 3 is a flow chart depicting a method 300 of managing a data delivery queue in accordance with an embodiment of the present invention.

A database query is received from a client and a timeout duration is determined for a connection to the client at operation 310. The database query may be received by data server 120 from client device 105, and the query may specify instructions for retrieving and processing data. In some embodiments, the database query includes an ETL job. Data server 120 may determine the timeout duration for a connection between data server 120 and client device 105, which will be used as a basis for iteratively sizing blocks of response data.

The database query is executed to begin generating response data at operation 320. Query execution module 130 executes the database query to generate response data, which is added to a queue as the response data becomes available. Response data that is added to a queue may be processed by queue manager 135 in a first-in, first-out order.

A block of response data is created, compressed, and transmitted to the client at operation 330. Initially, queue manager 135 selects a block size based on a predetermined value, such as a number of rows of response data, a number of rows multiplied by a number of columns, or a number of bytes. When a block of response data is created, the block is compressed by compression module 140 and then delivered to client device 105 by delivery module 145. Each block of data may be compressed individually and may thus include a dictionary to enable independent decompression of blocks.

Operation 340 determines whether there is any response data remaining. If there is response data remaining, then a block size for a next block is determined based on the delivery of a previous block at operation 350. If there is no more response data remaining, then delivery of the response data is completed and method 300 terminates.

While response data remains, subsequent blocks are created, compressed, and transmitted at operation 330 based on the block size determined at operation 350. At each iteration, block size is increased as long as the previous block is able to be created, compressed, and transmitted within a threshold based on the connection's timeout duration. Block size may be increased according to statistical rules, such as increasing a block size by a percentage of the previous block, or increasing a block size by a factor based on the timeout duration divided by the time required to compress and transmit a previous block. In some embodiments, the threshold is equal to the timeout duration or a value that is close to the timeout duration, such as 95% of the timeout duration. In other embodiments, the threshold may be some portion of the timeout duration, such as half of the timeout duration. As blocks are generated and transmitted, queue manager 135 may provide client device 105 with progress information indicating how much of the response data has been transmitted and is remaining. Thus, a progress representation of the delivery of response data may be tracked by client device 105. The progress representation may include a graphical user interface element, such as a bar chart or other indicator.

Figure 4:
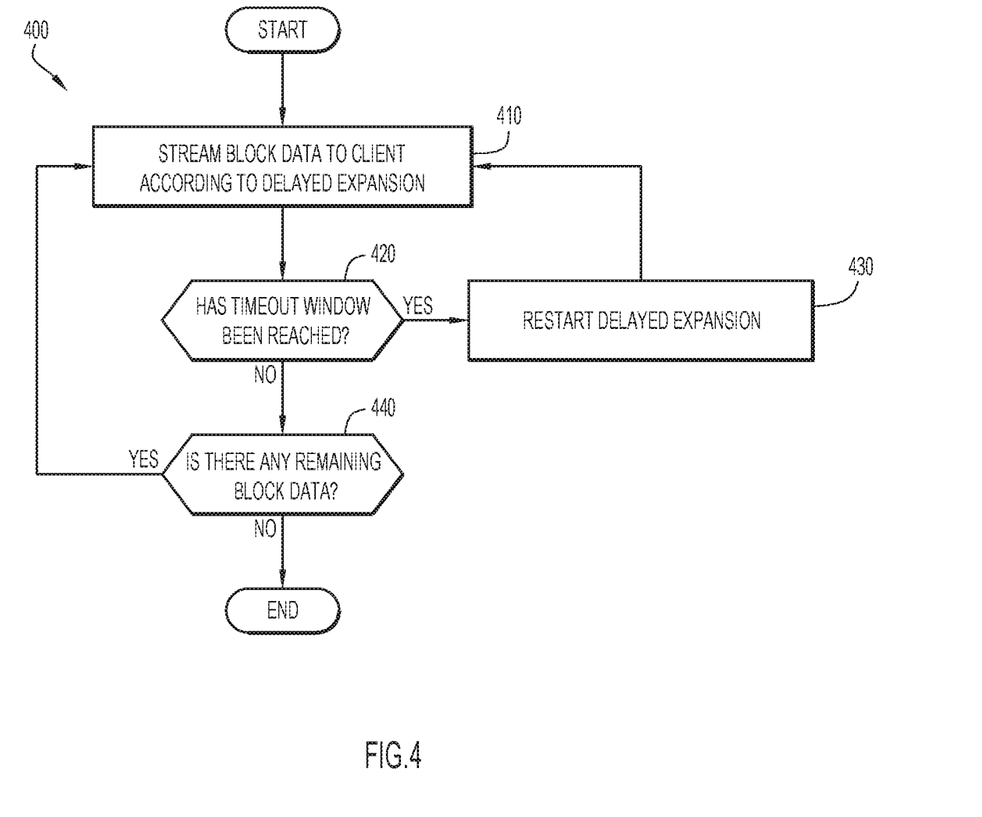
FIG. 4 is a flow chart depicting a method of transmitting data blocks in accordance with an embodiment of the present invention.

FIG. 4 is a flow chart depicting a method 400 of transmitting data blocks in accordance with an embodiment of the present invention.

Block data is streamed to a client according to a delayed expansion at operation 410. When a block of data has been compressed and is ready to be delivered, the data of the block is streamed to client device 105 by delivery module 145. Transmission of the block may be distributed over several chunks or groups of block data with delays in between. In particular, the amount of block data in each transmission may increase, and the delay between transmissions may increase until the delay approaches a timeout window of the connection between client device 105 and data server 120. In some embodiments, the delayed expansion may be a delayed binary expansion in which the delay after each transmission of data doubles (e.g., first a one second delay, then a two second delay, then a four second delay, then an eight second delay). Each transmission may contain a same number of bytes of block data, or the number of bytes of each transmission may increase.

Operation 420 determines whether a timeout window has been reached. If the delay between transmissions of block data begins to reach the connection's timeout duration, then the delayed expansion is restarted at operation 430, and the streaming of block data to the client continues at operation 410. Thus, transmissions of block data continue according to a delayed expansion that repeats over the timeout window until the block has been completely transmitted, which is determined by operation 440. When there is no more remaining block data to be transmitted, delivery module 145 may begin transmitting a subsequent block in accordance with presented embodiments.

Figure 5:
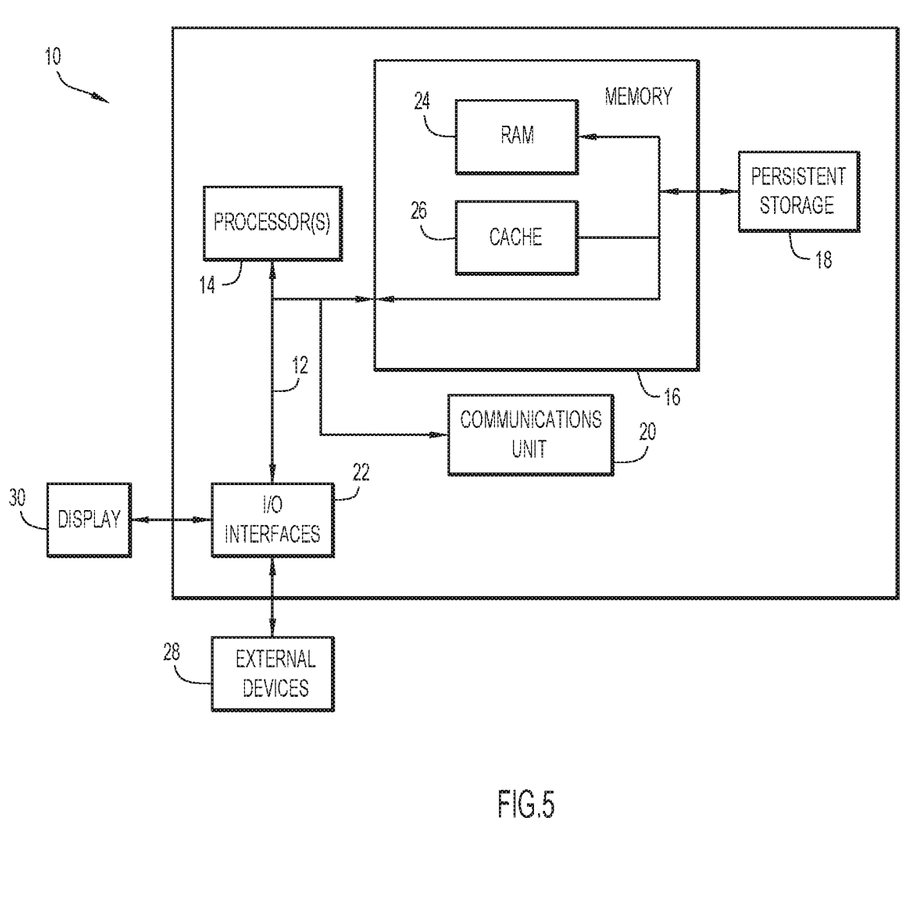
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 105 and/or data server 120 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to processing database queries using a data delivery queue (e.g., database queries, response data, block data, observed block performance data, dictionary data, progress data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105 and/or data server 120 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to processing database queries using a data delivery queue (e.g., database queries, response data, block data, observed block performance data, dictionary data, progress data, etc.) may include any information provided to, or generated by, client device 105 and/or data server 120. Data relating to processing database queries using a data delivery queue may include any desired format and arrangement, and may include any quantity of any types of fields of any size to store any desired data. The data relating to processing database queries using a data delivery queue may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to processing database queries using a data delivery queue), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of processing database queries using a data delivery queue.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client application 115, query execution module 130, queue manager 135, compression module 140, delivery module 145, etc.). These systems may include any types of monitors and input devices (e.g., keyboard, mouse, voice recognition, etc.) to enter and/or view information.

It is to be understood that the software (e.g., communications software, server software, client application 115, query execution module 130, queue manager 135, compression module 140, delivery module 145, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client application 115, query execution module 130, queue manager 135, compression module 140, delivery module 145, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to processing database queries using a data delivery queue). The database system may be implemented by any number of any conventional or other databases, data stores or storage structures (e.g., files, databases, data structures, data or other repositories, etc.) to store information (e.g., data relating to processing database queries using a data delivery queue). The database system may be included within or coupled to the server and/or client systems. The database systems and/or storage structures may be remote from or local to the computer or other processing systems, and may store any desired data (e.g., data relating to processing database queries using a data delivery queue).

The present invention embodiments may employ any number of any type of user interface (e.g., Graphical User Interface (GUI), command-line, prompt, etc.) for obtaining or providing information (e.g., data relating to processing database queries using a data delivery queue), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, processing requests for data to avoid connection timeouts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for processing data requests using a data delivery queue, the computer-implemented method comprising:
   processing a query received from a client to generate response data, wherein the response data is held in a queue prior to transmitting to the client;
   iteratively dividing the response data in the queue into a plurality of blocks, wherein each block of the plurality of blocks is compressed prior to transmitting to the client, and wherein, subsequent to an initial block, a block size of a given block is determined based on an amount of time to compress and transmit a preceding block; and
   transmitting the plurality of blocks to the client.

2. The computer-implemented method of claim 1, wherein the block size for each of the plurality of blocks is iteratively increased until the amount of time to compress and transmit a block equals a threshold duration.

3. The computer-implemented method of claim 2, wherein the threshold duration is based on a timeout duration of a connection to the client.

4. The computer-implemented method of claim 1, wherein a block of the plurality of blocks is transmitted to the client by delivering bytes of the block according to a delayed expansion comprising a plurality of delivery transmissions, wherein a given delivery transmission includes more bytes than a preceding delivery transmission, and wherein a time delay between each delivery transmission increases.

5. The computer-implemented method of claim 4, wherein the delayed expansion repeats over a timeout window of a connection to the client.

6. The computer-implemented method of claim 1, wherein the block size of the given block is identified according to one or more from a group of: a number of rows of response data in the given block, a number of columns multiplied by the number of rows of response data in the given block, and a data size subsequent to compressing the given block.

7. The computer-implemented method of claim 1, wherein a progress representation of delivery of the response data to the client is based on delivery progress of a current block and a number of remaining blocks of the plurality of blocks.

8. A computer system for processing data requests using a data delivery queue, the computer system comprising:
one or more computer processors;
one or more computer readable storage media;
program instructions stored on the one or more computer readable storage media for execution by at least one of the one or more computer processors, the program instructions comprising instructions to:
process a query received from a client to generate response data, wherein the response data is held in a queue prior to transmitting to the client;
iteratively divide the response data in the queue into a plurality of blocks, wherein each block of the plurality of blocks is compressed prior to transmitting to the client, and wherein, subsequent to an initial block, a block size of a given block is determined based on an amount of time to compress and transmit a preceding block; and
transmit the plurality of blocks to the client.

9. The computer system of claim 8, wherein the block size for each of the plurality of blocks is iteratively increased until the amount of time to compress and transmit a block equals a threshold duration.

10. The computer system of claim 9, wherein the threshold duration is based on a timeout duration of a connection to the client.

11. The computer system of claim 8, wherein a block of the plurality of blocks is transmitted to the client by delivering bytes of the block according to a delayed expansion comprising a plurality of delivery transmissions, wherein a given delivery transmission includes more bytes than a preceding delivery transmission, and wherein a time delay between each delivery transmission increases.

12. The computer system of claim 11, wherein the delayed expansion repeats over a timeout window of a connection to the client.

13. The computer system of claim 8, wherein the block size of the given block is identified according to one or more from a group of: a number of rows of response data in the given block, a number of columns multiplied by the number of rows of response data in the given block, and a data size subsequent to compressing the given block.

14. The computer system of claim 8, wherein a progress representation of delivery of the response data to the client is based on delivery progress of a current block and a number of remaining blocks of the plurality of blocks.

15. A computer program product for processing data requests using a data delivery queue, the computer program product comprising one or more computer readable storage media collectively having program instructions embodied therewith, the program instructions executable by a computer to cause the computer to:
process a query received from a client to generate response data, wherein the response data is held in a queue prior to transmitting to the client;
iteratively divide the response data in the queue into a plurality of blocks, wherein each block of the plurality of blocks is compressed prior to transmitting to the client, and wherein, subsequent to an initial block, a block size of a given block is determined based on an amount of time to compress and transmit a preceding block; and
transmit the plurality of blocks to the client.

16. The computer program product of claim 15, wherein the block size for each of the plurality of blocks is iteratively increased until the amount of time to compress and transmit a block equals a threshold duration.

17. The computer program product of claim 16, wherein the threshold duration is based on a timeout duration of a connection to the client.

18. The computer program product of claim 15, wherein a block of the plurality of blocks is transmitted to the client by delivering bytes of the block according to a delayed expansion comprising a plurality of delivery transmissions, wherein a given delivery transmission includes more bytes than a preceding delivery transmission, and wherein a time delay between each delivery transmission increases.

19. The computer program product of claim 18, wherein the delayed expansion repeats over a timeout window of a connection to the client.

20. The computer program product of claim 15, wherein the block size of the given block is identified according to one or more from a group of: a number of rows of response data in the given block, a number of columns multiplied by the number of rows of response data in the given block, and a data size subsequent to compressing the given block.

* * * * *